US011336608B2

(12) United States Patent
Daniali (10) Patent No.: US 11,336,608 B2
(45) Date of Patent: May 17, 2022

(54) SMART ENTERPRISE EMAIL REDUCTION (71) Applicant: T-Mobile USA, Inc., Bellevue, WA (US)

(72) Inventor: Ali Daniali, Lynnwood, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/359,535

(22) Filed: Mar. 20, 2019

(65) Prior Publication Data

US 2020/0304450 A1 Sep. 24, 2020

(51) Int. Cl.
*G06F 15/16* (2006.01)
*H04L 51/48* (2022.01)
*H04L 51/42* (2022.01)
*H04L 51/56* (2022.01)

(52) U.S. Cl.
CPC .............. *H04L 51/28* (2013.01); *H04L 51/22* (2013.01); *H04L 51/36* (2013.01)

(58) Field of Classification Search
CPC .......... H04L 51/28; H04L 51/22; H04L 51/36
See application file for complete search history.

(56) References Cited

U.S. PATENT DOCUMENTS

| 7,227,930 | B1* | 6/2007 | Othmer | H04M 1/656 |
| | | | | 379/85 |
| 7,606,706 | B1* | 10/2009 | Rubin | H04L 51/04 |
| | | | | 379/88.01 |
| 9,531,862 | B1* | 12/2016 | Vadodaria | G06F 3/0488 |
| 2004/0019649 | A1* | 1/2004 | Tanimoto | H04L 51/24 |
| | | | | 709/206 |
| 2009/0181702 | A1* | 7/2009 | Vargas | H04L 51/36 |
| | | | | 455/466 |
| 2010/0070597 | A1* | 3/2010 | Arcieri | G06Q 20/10 |
| | | | | 709/206 |
| 2010/0088140 | A1* | 4/2010 | Gil | G06Q 10/103 |
| | | | | 705/7.15 |
| 2011/0179126 | A1* | 7/2011 | Wetherell | H04L 51/36 |
| | | | | 709/206 |
| 2012/0054288 | A1* | 3/2012 | Wiese | H04L 51/36 |
| | | | | 709/206 |
| 2012/0320912 | A1* | 12/2012 | Estrada | H04W 4/08 |
| | | | | 370/389 |
| 2015/0347924 | A1* | 12/2015 | Zeng | G06Q 10/087 |
| | | | | 706/12 |
| 2016/0191472 | A1* | 6/2016 | Ghafourifar | H04L 29/06 |
| 2019/0297046 | A1* | 9/2019 | Greenspan | H04L 51/22 |

* cited by examiner

*Primary Examiner* — John B Walsh
(74) *Attorney, Agent, or Firm* — Han Santos, PLLC (57) ABSTRACT

Techniques are described herein for managing email traffic and reducing the flow of incoming messages by providing alternate communication service between a sender of an email and a recipient of the email. The techniques include detecting a new email initiated via an email client from a sender's user device, the new email being addressed to a recipient's email address that is associated with a recipient's email account. The techniques also include triggering the email client to display an option for an alternate communication service to communicate with a recipient associated with the recipient's email address based at least on communication settings associated with the recipient's email account. The techniques further include receiving, from the sender's user device, a selection for the alternate communication service to communicate with the recipient.

15 Claims, 4 Drawing Sheets

SMART ENTERPRISE EMAIL REDUCTION

BACKGROUND

Email is a constant presence in the workplace. Email overload can create a large backlog of emails that can clog inbox and lead to even more email and meeting requests. To regain control over email, clearing and managing inboxes on a regular basis is important. However, deleting, responding, and filing emails several times a day is time-consuming and counter-productive. One way to reduce email load without requiring constant managing of inboxes is to control the flow of incoming messages by sending and receiving fewer emails and limiting to whom emails are sent.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

This disclosure is directed to techniques for reducing enterprise email traffic. In various embodiments, the techniques include utilizing a smart enterprise email reduction (SEER) server that is configured to enable a sender of an email to communicate with a recipient of the email using various communication services in addition to or instead of email. In various embodiments, the SEER server and an email client (e.g., a sender's email client and a recipient's email client) can implement a plugin to the email client or an application programming interface (API). For instance, the plugin can notify the SEER server upon detecting when a sender initiates the email client to compose a new email and add a recipient's email address in the "To:" field. Upon receiving a notification from the email client via the plugin, the SEER server determines whether the recipient's email address is associated with an email account that has SEER-enabled settings. Additionally, or alternatively, the email client can directly notify the SEER server using API based services to provide the SEER server with the recipient's email address.

If the SEER server determines that the email account associated with the recipient's email address has SEER-enabled settings, the SEER server can transmit a notification to the recipient associated with the email address when an email is being written to him or her. In various embodiments, the notification can be provided as a banner notification or a popup notification that can be displayed on the recipient's user device. In response to receiving the notification, the recipient can indicate whether he or she is available or unavailable and transmit a response indicating his or her availability to the SEER server. Before the email is sent to the recipient, the SEER server can determine, based at least on the recipient's response, whether the recipient is available to communicate by phone, text, instant messaging, and/or so forth. If the recipient does not respond to the notification, the SEER server can determine whether the recipient is available based at least on the timestamp of the recipient's last activity. In response to receiving a notification from the SEER server via plugins or APIs that the recipient is available, the sender's email client can present on a user interface of the email client, one or more options to contact the recipient in addition to or instead of email using alternate communication services.

The sender's email client user interface may display the one or more options including alternate communication services to contact the recipient. In various embodiments, the alternate communication services can include phone, short message service (SMS)/multimedia messaging service (MMS), messaging, video call, and/or so forth. The recipient can customize his or her preferred ways of being contacted in his or her communication settings that may be provided by the recipient's email client. For instance, the recipient can indicate whether he or she is available by phone, text (SMS/MMS), messaging, video call, and/or so forth. If the recipient prefers to be contacted only via email, then the recipient's email account may indicate that it is SEER-disabled and no other ways of contacting the recipient are displayed on the recipient's email client user interface. In various embodiments, an indication can be stored locally on the sender's user device that the recipient's email account has SEER-enabled or SEER-disabled settings.

The sender may select the one or more alternate communication services to contact the recipient. Upon selecting an alternate communication service, the sender's email is saved to the sender's draft folder and a communication session is initiated. If the sender selects an option to call the recipient, a call can be initiated from the sender's user device to the recipient's user device. In some embodiments, the call can be a voice call or a video call. Additionally, the call can be an in-application call that is made via the sender's email client and/or the recipient's email client using Session Initiation Protocol (SIP)/Voice over Internet Protocol (VoIP). Similarly, if the sender selects an option to text the recipient, a text can be transmitted from the sender's user device to the recipient's user device via a text application on the sender's user device. The sender's user device may retrieve the recipient's contact information such as the recipient's phone number from the sender's address book, which may reside on the sender's user device. The sender's address book can also be managed and/or stored via the sender's email client. If the sender selects an option to message the recipient, a chat session can be initiated via a messaging application on the sender's user device. In various embodiments, a third party messaging application can be used to initiate a chat session, in which case the sender and/or the recipient can leave its respective email client in order to participate in the chat session.

The communication session may be recorded and saved and/or archived in a communication session database. For example, the voice call or the video call between the sender and the recipient may be recorded. In this case, the sender's user device and/or the recipient's user device can display a window providing the sender and/or the recipient an option to record the call via a recording application on the corresponding user device. After the call is terminated, the sender's user device and/or the recipient's user device can display a second window asking the sender and/or the recipient to save or discard the recording. The sender's user device and/or the recipient's user device can also display a window providing the sender and/or the recipient an option to end the recording and resume the recording before the call is terminated. Similarly, text messages and a chat session transmitted between the sender and the recipient can be saved and/or archived as a chat log in the communication session database.

Upon terminating the communication session, the sender's email client prompts the sender to resume composing the email or discard the email. If the sender selects to discard the email, no further actions are needed. If the sender selects to resume composing the email, the email can be tied to the communication session such that the recordings from the communication session, if any, can be referenced in the email. For instance, the email can comprise a link or an attachment to the recordings.

The techniques described herein may be implemented in a number of ways. Example implementations are provided below with reference to the following figures.

Example Network Architecture

Figure 1:
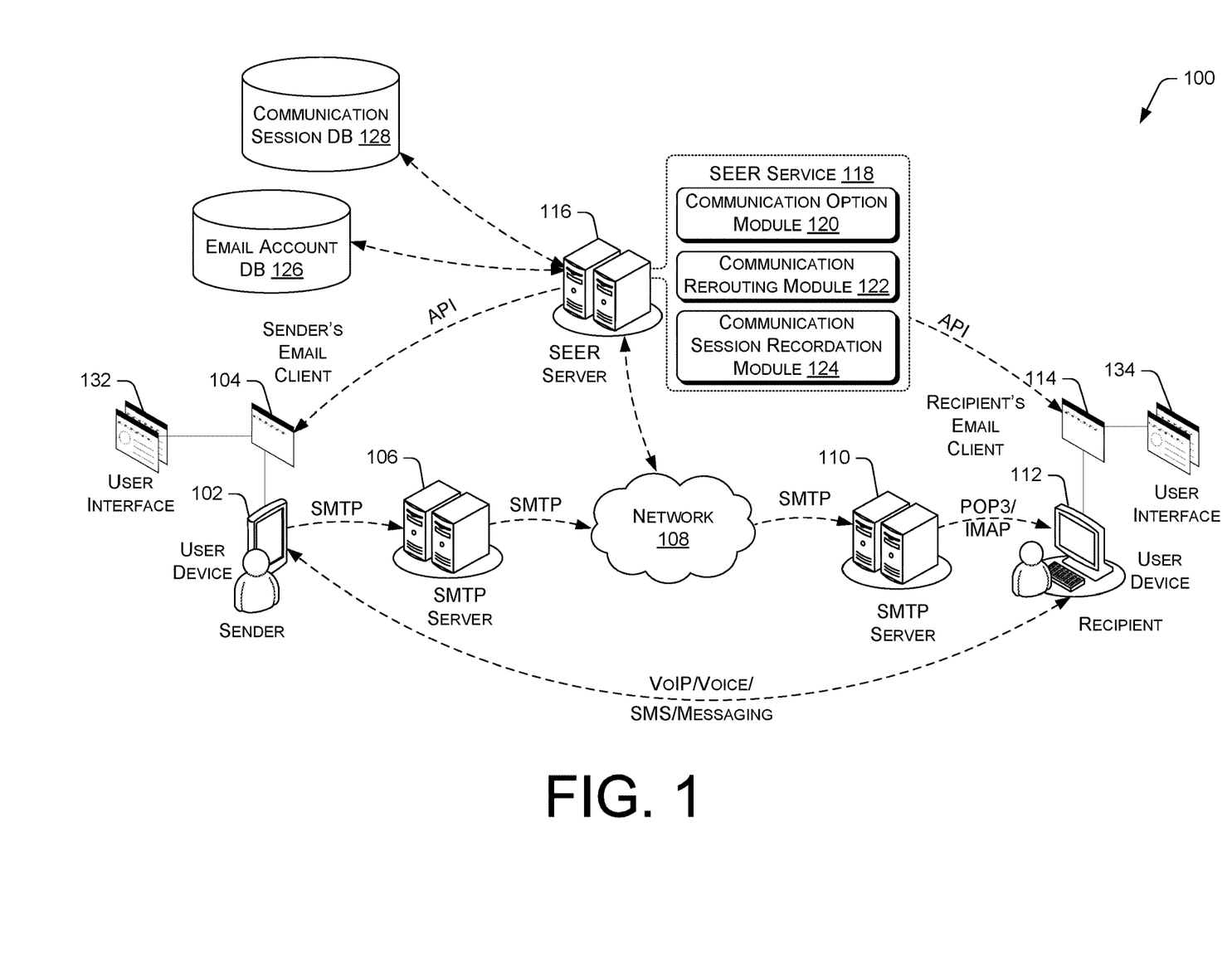
FIG. 1 illustrates an example of a network architecture for reducing enterprise email traffic.

FIG. 1 illustrates example architecture for reducing enterprise email traffic. The architecture may include one or more user devices 102 and 112. A first user device 102 can comprise smartphones, mobile devices, personal digital assistants (PDAs) or other electronic devices having a wireless communication function that are capable of receiving inputs, processing the inputs, and generating output data. A second user device 112 can comprise general-purpose computers, such as desktop computers, laptops, and/or so forth. The user devices 102 and 112 are connected to a telecommunications network 108 utilizing one or more wireless base stations (not pictured) or any other common wireless or wireline network access technologies.

For instance, the network 108 may include a cellular network that implements 2G, 3G, 4G, 5G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks (e.g., the Internet).

In the illustrated embodiment, the first user device 102 is operated by a sender of an email and the second user device 112 is operated by a recipient of the email. The sender and/or the recipient can be a subscriber of a telecommunications service provider. Each of the user devices 102 and 112 may comprise an email client 104 and 114 (i.e., a mail user agent (MUA)) installed thereon. More specifically, the first user device 102 hosts the sender's email client 104 and the second user device 112 hosts the recipient's email client 114. The sender's email client 104 and the recipient's email client 114 need not be the same client. Thus, the sender's email client 104 can comprise a first email client and the recipient's email client 114 can comprise a second email client, wherein the first email client and the second email client are operated by different service providers. Additionally, or alternatively, a web interface may be used for interacting with an incoming mail server (i.e., webmail such as Gmail).

A user (i.e., the sender and/or the recipient) can access multiple email accounts via the email clients 104 and 114. Individual email accounts can be associated with an email address. The email accounts can include Outlook, AOL, Hotmail, and corporate email accounts. The email clients 104 and 114 can allow the user to switch among multiple email accounts. For instance, the email clients 104 and 114 can provide user interfaces 132 and 134, respectively, for displaying an inbox for different email accounts by enabling the user to select one of the listed email accounts. In various embodiments, the email clients 104 and 114 can provide a unified inbox where multiple email accounts are accessible from the same screen.

The email clients 104 and 114 can also provide user interfaces 132 and 134, respectively, for enabling the user to customize a communication setting for each of the email accounts. The email account settings for different email accounts can be stored in an email account database 126 that may be in communication with an email server (e.g., Simple Mail Transfer Protocol (SMTP) server) associated with an email account, such as the SMTP server 106 and the SMTP 110. Additionally, several user-specific settings and configurations can be stored in the user devices 102 and 112, respectively, depending on their capabilities.

In one example, the user can specify his or her preferred ways of being contacted in addition to or instead of email. In various embodiments, each of the email client user interfaces 132 and 134 can include a screen that asks the user to specify or select one or more alternate communication services, including, without limitations, phone, text, messaging, video, and/or so forth. In addition, the user can specify or select the times of the day when he or she is available over phone, text, messaging, video, and/or so forth. The time of the day when the user is available over one communication service may be different from the time of the day the user is available over another communication service. For example, the user can indicate that he or she is available over the phone in the morning, but only available over text in the afternoon.

Each of the email client user interfaces 132 and 134 can also include a screen that enables the user to set filters based on one or more conditions. For instance, the filters automatically make available one or more communication services based on a sender's email address. In this way, the recipient may be available via multiple communication services for a first sender associated with a first sender's email address, but available only via email for a second sender associated with a second sender's email address. Additionally, the filters automatically make available one or more communication services based on one or more keywords in the subject line in addition to the sender's email address.

In various embodiments, the user may be able to customize other settings, such as notification settings, display settings, and/or so forth. For instance, the notification settings may enable the user device 112 to provide a badge notification, a banner notification, and/or so forth when the recipient receives a new email. The display settings may enable each of the user interface 132 and 134 to display multiple inboxes in various configurations. Additionally, the display settings may enable a sender to view options for selecting a communication service while composing an email. If the sender selects a messaging option to contact the recipient, a chat box can be displayed adjacent to or within the inbox or superimposed on top of the inbox such that the sender does not have to switch between screens.

The email clients 104 and 114 can be used to retrieve and send emails. For accessing an email account via the email client 104, communication can be established between the user device 102 and the SMTP server 106. Likewise, for accessing an email account via the email client 114, communication can be established between the user device 112 and the SMTP server 110. The user devices 102 and 112 can connect to the SMTP servers 106 and 110, respectively, via the telecommunications network 108 using standard Post Office Protocol version 3 (POP3)/SMTP protocols. Alternatively, the user devices 102 and 112 can use a generic and a user-specific POP3/SMTP configuration. The user may select the POP3/SMPT settings via the user devices 102 and 112 to be used before starting the communication. Each of the SMTP servers 106 and 110 can comprise a mail submission agent (MSA), a mail user agent (MUA). A mail retrieval agent (MRA), a mail exchanger (MX), a mail delivery agent (MDA), and/or a mail transfer agent (MTA). The user devices 102 and 112 can be connected to a primary or default SMTP servers 106 and 110, respectively, and one or more alternate/backup SMTP servers (not pictured). In various embodiments, the email clients 104 and 114 can suggest an alternate/backup SMTP server by looking up the domain portion of an email address in a Domain Name System (DNS) server (not pictured).

In various embodiments, when a sender opens a compose window in the email client 104 to write an email (including a reply to or forward of another email), the standard "To:" and "Subject:" lines associated with the email are displayed. The "From:" address in an email generally corresponds to the sender's default email address (e.g., the email address of the account from which the sender is sending the email). Alternatively, if the sender's user device 104 is configured with multiple email addresses, the sender can specify an email address in the "From:" field of an email that differs from a default email address associated with the sender.

The email client 104 can communicate with a SEER server 116 via plugins installed for the email client 104 and/or APIs. The SEER server 116 is configured to reduce overall email traffic by facilitating communication using various communication services between the sender and the recipient before an email is sent. The SEER server 116 provides a communication option module 120, a communication rerouting module 122, and a communication session recordation module 124.

The SEER server 116 can receive a notification from the plugin to the email client 104 when a recipient's email address is added in the "To:" field. Upon receiving the notification, the SEER server 116 determines whether the recipient's email address in the "To:" field is associated with an email account that has SEER-enabled settings (i.e., the recipient is a participant in the SEER service 118). If the SEER server 116 determines that the email account has SEER-enabled settings, the SEER server 116 queries the recipient's user device 112 to determine whether the recipient is available to be contacted using one or more communication services other than email. If the SEER server 116 receives a positive response from the recipient's user device 112, the SEER server 116 denotes that the recipient is available. If the recipient is available, the communication option module 120 of the SEER server 116 triggers the sender's email client to display via the sender's email client user interface 132 options to contact the recipient using one or more alternate communication services. If there are multiple recipients, the sender's email client user interface 132 displays options to contact each recipient (i.e., participant) using one or more alternate communication services. In various embodiments, an API can be implemented to notify the SEER server 116 that a recipient's email address is added to an email. In turn, the SEER server 116 triggers the sender's email client to display options for contacting the recipient using one or more communication services via the communication option module 120.

The email client 104 may also display the recipient's availability on the user interface 132 by displaying one or more graphical indicia adjacent to the recipient's email address. For example, the email client 104, via the user interface 132, can display an icon adjacent to the recipient's email address, the icon comprising a green circle when the recipient is available. The icon can also comprise a yellow circle when the recipient is away, and a red circle when the recipient is busy or unavailable. In various embodiments, graphical indicia comprising other shapes, symbols, characters, texts, colors, and/or any combination thereof may be displayed to indicate the recipient's availability. For instance, the recipient's email address may be displayed in a more subdued color if the recipient is not available.

The alternate communication services to contact the recipient may be displayed in the foreground, for example, in a popup window within the sender's email client user interface 132. The window can display one or more icons, checkboxes, and/or options that the sender can select. The individual icons, checkboxes, and/or options correspond to an alternate communication service to contact the recipient. Upon receiving a selection for an option to contact the recipient using an alternate communication service, the email client 104 saves the email draft in the sender's draft folder. The email client 104 can automatically save the email draft on a regular basis.

Additionally, the communication rerouting module 122 enables the sender's user device 102 to initiate a communication session over the network 108. The network 108 can comprise an IP Multimedia Subsystem (IMS) IMS core (not pictured), which comprises gateways, the Call Session Control Function (CSCF) node, and telephony application server (TAS). The CSCF node may handle SIP sessions, which are communication sessions for packet-based voice and video calls, instant messaging over IP networks, and/or so forth. The CSCF nodes may identify a recipient's user device 112 based on a registry of user devices (e.g., the Implicit Registration Set (IRS)) of a recipient (i.e., subscriber), stored in a user information server (e.g., Home Subscriber Server (HSS)) of the network 108. The IRS can include an IP Multimedia Public Identity (IMPU) of the subscriber in the form of the Mobile Station International Subscriber Directory Number (MSISDN) as well as IP Multimedia Private Identity (IMPI) in the form of device identifiers, such as International Mobile Equipment Identity (IMEI), of the user devices. The user devices that are registered by the CSCF node of the network 108 may be able to use the common telephone number to initiate and receive communication.

If the sender selects to call the recipient, the sender's user device 102 can initiate a phone call (e.g., VoIP) to the recipient's user device 112. In one example, the sender's user device 102 may use the recipient's email address to look up the corresponding phone number associated with the recipient's user device 112 in the sender's address book that may be stored remotely or locally on the sender's user device 102. Additionally, or alternatively, the SEER server 116 may retrieve the recipient's phone number using the recipient's email address from the email account database 126. The sender's user device 102 may also be configured to map the recipient's email address to the MSISDN information corresponding to the recipient, wherein the MSISDN may be a phone number that is mapped to an identifier of a subscriber identification module (SIM) installed in the recipient's user device 112. Upon retrieving the recipient's phone number, the sender's user device 102 automatically dials the phone number associated with the recipient's user device 112. The email client 104 may provide in-application calling capabilities, depending upon embodiments. The sender and the recipient can also conduct a video call by enabling the cameras of the user devices 102 and 112.

If the sender selects to text the recipient, the sender's user device 102 can initiate a text to transmit to the recipient's user device 112. As described above, the sender's user device 102 may use the recipient's email address to look up the corresponding phone number associated with the recipient's user device 112 in the sender's address book that may be stored remotely or locally on the sender's user device 102. The SEER server 116 can also obtain the recipient's phone number from the email account database 126. Additionally, or alternatively, the sender's user device 102 can use the MSISDN information corresponding to the recipient to transmit a text message to the recipient's user device. In various embodiments, the recipient's email address may be used for texting. Messaging API may be used to facilitate SMS/MMS messaging from within the email client 104. The messaging API can support Internet Protocol (IP) or Hypertext Transfer Protocol (HTTP) based messaging capabilities under a unified programming toolkit.

If the sender selects to message the recipient, the email client 104 can provide an instant messaging feature which allows the sender to talk in real-time to the recipient. The messaging feature can be used within a web browser or downloaded as an extension. The sender can initiate a new chat session upon selecting messaging as an alternate communication service. Alternatively, the sender can initiate a new chat session by selecting a chat icon on the email client user interface 132. In various embodiments, a third party messaging application may be used. In this regard, a chat API provided by an API server can be used to provide real-time chat features. The chat API can support chat history, typing indicators, read receipts, and/or so forth.

If one or more recipients are available for communication other than email, the sender and the recipients can communicate concurrently on a group call or a group messaging session. For example, the sender can create a group call by adding the recipients to the call on a one-by-one basis. Additionally, or alternatively, the SEER server 116 may be configured to provide a call-in number for the sender and available recipients to initiate a group call. In various embodiments, the user interface of the user devices 102 and 112 can display a window with the call-in number prompting the user to make a phone call. Upon selecting the call option, the sender and the recipients can initiate a group call. The group call can comprise a video conference.

In another example, the recipient can add recipients on a one-by-one basis to engage in a group text or a group chat session. Additionally, or alternatively, the SEER server 116 may be configured to create a private chat room for the sender and available recipients. In various embodiments, the email client user interface 132 can display a chat room via a popup window. To allow the chat room participants to enter the chat room, the SEER server 166 can generate a unique chat session code that the sender and the recipients can enter in order to join a chat session. Once the code is validated, the sender and the recipients can initiate a chat session.

The communication session recordation module 124 is configured to record a communication session and save the recording in a communication session database 128. The database 128 can comprise a data management layer that includes software utilities for facilitating the acquisition, processing, storing, reporting, and analysis of data from multiple data sources (e.g., user devices 102 and 112). In various embodiments, the communication session database 128 can interface with an API for providing data access. In some embodiments, the communication session database 128 may be operatively connected to the SEER server 116. For example, the voice call or the video call between the sender and the recipient may be recorded via the communication session recordation module 124. In this case, the sender's user device 102 and the recipient's user device 112 can display via the user interface 132 and 134 a window providing the sender and/or the recipient an option to record the call. In various embodiments, the sender and/or the recipient must agree to record the call in order for the call to be recorded. Thus, if the sender and/or the recipient does not select an option to record the call, then the call is not recorded.

After the call is terminated, the communication session recordation module 124 can prompt each of the sender's user device 102 and the recipient's user device 112 to save or discard the recording. In this regard, the user interfaces 132 and 134 can display a second window prompting the sender and/or the recipient to save or discard the recording. If the sender and/or the recipient selects to save the recording, the recording is stored in the communication session database 128. Each of the sender's user device 102 and the recipient's user device 112 can also display via the user interfaces 132 and 134, respectively, a window providing the sender and/or the recipient an option to end the recording (and resume the recording) before the call is terminated. Upon receiving an indication from the sender's user device 102 or the recipient's user device 112 to end the recording, the communication session recordation module 124 ends the recording that can be saved or discarded. In various embodiments, voice or video recordings may be transcribed via a transcriber component of the communication session recordation module 124 or a third party service. Thereafter, a transcript of the call may also be saved and/or archived in the communication session database 128.

In one embodiment, speech analytics may be used to mine audio speech within the voice or video recording for data. The speech analytics may be a component of the communication session recordation module 124 or a third party service. The speech analytics is designed to capture the phonetic combinations, special words, numbers, characters, sounds, tones, vibration, and speed of conversation to identify specific elements. The speech analytics listens for trigger words to mark a specific time frame in an audio or video recording. This is done by evaluating speech, transcribing it into text along with timestamps of text occurrence, and then querying the system to produce all the audible or visual results that correspond to specific triggers. To expedite such a mining process, speech recognition patterns can be applied to the speech analytics in order to mine larger segments of the audio or video recording, thereby allowing the system to analyze a larger volume of audio or video recording in a shorter amount of time.

Similarly, the communication session recordation module 124 can save and/or archive the text messages and messages from a chat session in the communication session database 128. For example, the chat API can provide a chat history feature to save messages exchanged during a chat session, which may be referenced via a unique chat session code. At the end of the communication session, the email client 104, 114 or a third-party application supporting texting or messaging can ask the sender and/or the recipient to save or discard the chat log. If the sender and/or the recipient selects to save the recording, the recording is stored in the communication session database 128. The recording can be saved in various file formats. Metadata about the file and its contents may be contained in a file header. For example, the metadata may contain authoring information such as who made the recording (i.e., the sender and the recipient), when and where the recording was made, and/or so forth.

After terminating the call, text, or messaging, the email client user interface can also display a window asking the sender whether to continue drafting the email or discard the email. If the sender selects to continue drafting the email, metadata may be used by the email client 104 to associate the recordings from a communication session to the email. If the sender does not continue drafting the email, the email can be discarded, reducing the flow of incoming emails for the recipient.

When an email is sent from the sender's email client 104 (i.e., the source client) via the user device 102, the message is routed to the sender's Internet Service Provider (ISP) that can provide an SMTP server 106, which can comprise an MSA tasked with submitting the email to the recipient's ISP. The recipient's ISP comprises a receiving SMTP server 110 that can comprise an MTA that transfers the email to the MDA for delivery to the recipient's email client 114 (i.e., destination client MRA/MUA). The MDA can store the email as it waits for the recipient to accept it. The SMTP servers 106 and 110 can communicate using the protocol SMTP.

The MDA can communicate using the POPS, which is used for retrieving email and leaving a copy of it on the SMTP server 110. The MDA can also communicate using Internet Message Access Protocol (IMAP), which is used for coordinating the status of emails (e.g., read, deleted, moved) across multiple email clients. With IMAP, a copy of every message is saved on the SMTP server 110 for synchronization. The MDA can be protected by credentials (e.g., login username and password).

In various embodiments, the SEER server 116 may take over the communication with the SMTP email server 106 and 110 to send/retrieve emails of the identified email account. The SEER server 116 can be implemented either as an integral part of an SMTP server 106 and 110 or as an external stand-alone part as shown in FIG. 1. The SEER server 116 can also support POP3/Secure Sockets Layer (SSL) and SMTP/SSL access if required. The secure SSL connection must be decoded at the SEER server 116 side and re-encoded by the SEER server 116 to communicate with the SMTP servers 106 and 110. Additionally, an ISP may lock down its SMTP servers 106 and 110 so that only its subscribers can use them, or more particularly, only user devices whose IP address belongs to the ISP's domain.

Example Computing Device Components

Figure 2:
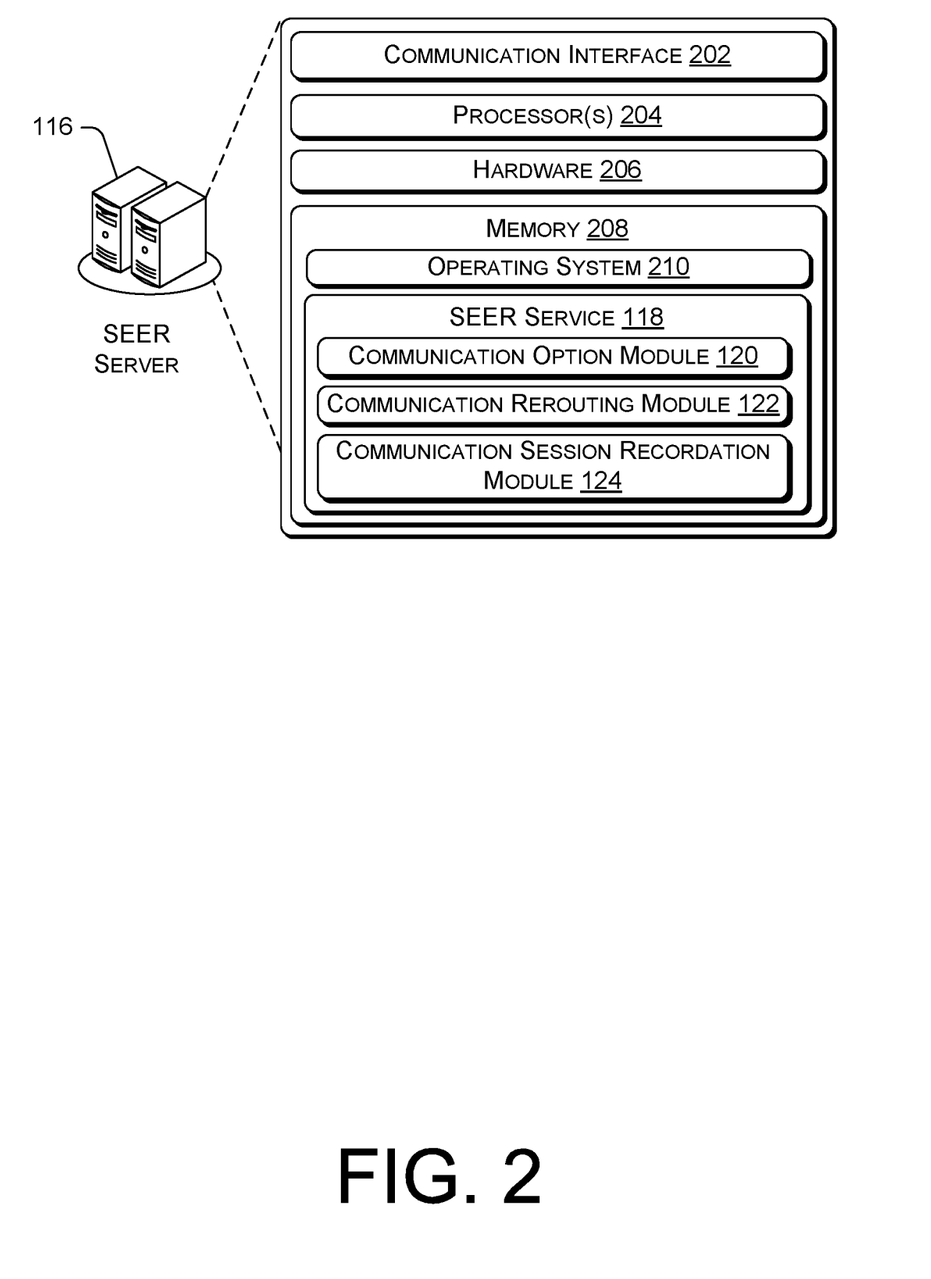
FIG. 2 is a block diagram showing various components of an illustrative computing device that implements smart enterprise email reduction.

FIG. 2 is a block diagram showing various components of an illustrative SEER server 116. It is noted that the SEER server 116 as described herein can operate with more or fewer of the components shown herein. Additionally, the SEER server 116 as shown herein or portions thereof can serve as a representation of one or more of the computing devices of the present system.

The SEER server 116 may include general-purpose computers, such as desktop computers, tablet computers, laptop computers, servers (e.g., on-premise servers), or other electronic devices that are capable of receiving inputs, processing the inputs, and generating output data. The SEER server 116 may be operated by the telecommunications service provider or a third-party entity that is working with the telecommunications service provider. The SEER server 116 may store data in a distributed storage system, in which data may be stored for long periods of time and replicated to guarantee reliability.

Accordingly, the SEER server 116 may provide data and processing redundancy, in which data processing and data storage may be scaled in response to demand. Further, in a networked deployment, new SEER servers 116 may be added. Thus, the SEER server 116 can include a plurality of physical machines that may be grouped together and presented as a single computing system. Each physical machine of the plurality of physical machines may comprise a node in a cluster. The SEER server 116 may also be in the form of virtual machines, such as virtual engines (VE) and virtual private servers (VPS).

The SEER server 116 may include a communication interface 202, one or more processors 204, hardware 206, and memory 208. The communication interface 202 may include wireless and/or wired communication components that enable the SEER server 116 to transmit data to and receive data from other networked devices. In at least one example, the one or more processor(s) 204 may be a central processing unit(s) (CPU), graphics processing unit(s) (GPU), both a CPU and GPU or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 204 may also be responsible for executing all computer applications stored in the memory, which can be associated with common types of volatile (RAM) and/or non-volatile (ROM) memory. The hardware 206 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 208 may also include a firewall. In some embodiments, the firewall may be implemented as hardware 206 in the SEER server 116.

The processors 204 and the memory 208 of the SEER server 116 may implement an operating system 210, a communication option module 120, a communication rerouting module 122, and a communication session recordation module 124. The operating system 210 may include components that enable the SEER server 116 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The communication option module 120 enables a sender and a receiver of an email to communicate using a communication service other than email before the email is sent. Upon receiving, from an email client via plugins or APIs, a notification that a recipient's email address is added to an email, the communication option module 120 may determine whether the recipient's email address is associated with a SEER-enabled email account. Additionally, or alternatively, the communication option module 120 can determine whether the recipient is a participant of the SEER service based at least on the recipient's email address. If the recipient is a participant, the SEER server can query the recipient's user device whether the recipient is available.

In response to receiving an indication from the recipient's user device that the recipient is available, the communication option module 120 communicates with an email account database to retrieve email account information associated with the email address. For example, the email account database may comprise user-specific customized communication settings for alternate communication services. The communication settings are associated with an email account corresponding to an email address. In various embodiments, the communication option module 120 may be able to provide credentials to access the recipient's email account information.

The communication option module 120 may enable a recipient user to customize his or her preferred ways of being contacted in communication settings. The communication settings can be configured via the email client by way of a plugin. The communication settings may be stored locally and/or in a database. The communication settings can indicate whether the recipient prefers to be contacted via one or more communication services such as phone, text (SMS/MMS), messaging, and/or video in addition to, or instead of email, when the recipient is available. Additionally, the recipient can specify the conditions under which he or she is available by phone, text (SMS/MMS), messaging, and/or video in addition to, or instead of email. If the recipient prefers to be contacted only via email, then the recipient's email account may not be SEER-enabled.

Based at least on the recipient's communication settings, the communication option module 120 can trigger the sender's email client to present to a sender, one or more options to communicate with the recipient. The options can be displayed to the sender via the sender's email client user interface by way of the email plugin or APIs. Upon receiving a selection for a communication service from the sender, the email client can communicate the selection to the communication rerouting module 122 via the plugin initiate a communication session between the sender and the recipient.

The communication service (other than by email) used for the communication session is based at least on the recipient's communication settings and/or the sender's selection. For example, a recipient may indicate in the communication settings that he or she is available by phone and text in addition to or instead of email. If the recipient selects "phone" instead of "text," the communication rerouting module 122 may enable the sender's user device to call the recipient's user device. If the recipient selects "text" instead of "phone," the communication rerouting module 122 may enable the sender's user device to text the recipient's user device.

In various embodiments, the sender and/or the recipient can change the communication service used during a communication session. In this regard, the communication rerouting module 122, in response to receiving a second selection for a communication service by way of the email plugin or API, may terminate the communication session and initiate a new communication session. For example, the sender can select an option to message the recipient during an in-application call with the recipient. In this case, the communication rerouting module 122 can terminate the communication session for the call in response to receiving, from the sender's email client plugin, a request to end the call. Thereafter, the communication rerouting module 122 can initiate a new communication session in response to receiving, from the sender's email client plugin, a request to initiate a new chat session. In this way, the communication rerouting module 122 enables the recipient to receive communication from the sender via a first communication service (e.g., phone, text, instant messaging) and then receive communication from the sender via a second communication service upon determining that the recipient is available to communicate via the second communication service.

Upon receiving a selection for a communication service from the sender, the communication session recordation module 124 may also prompt the sender and the recipient to record the communication session. The communication session recordation module 124 can implement an API such that the prompt may appear via the sender's email client user interface and the recipient's email client user interface. In response to receiving confirmation from the sender and the recipient to record the communication session, the communication session recordation module 124 can record the audio and/or video of the communication session.

In various embodiments, the communication session recordation module 124 may also transcribe the audio and/or video stream for speech analytics using a transcriber service or speech analytics components, respectively. If the communication session comprises texting or messaging, a text or chat log can be recorded. The communication session recordings can be saved in various file formats and stored in a communication session database 128. Metadata about the file and its contents may be contained in a file header. For example, the communication session recordings can be associated with meta keywords tags, unique communication session identifier or code, and/or other information.

Example Processes

Figure 3:
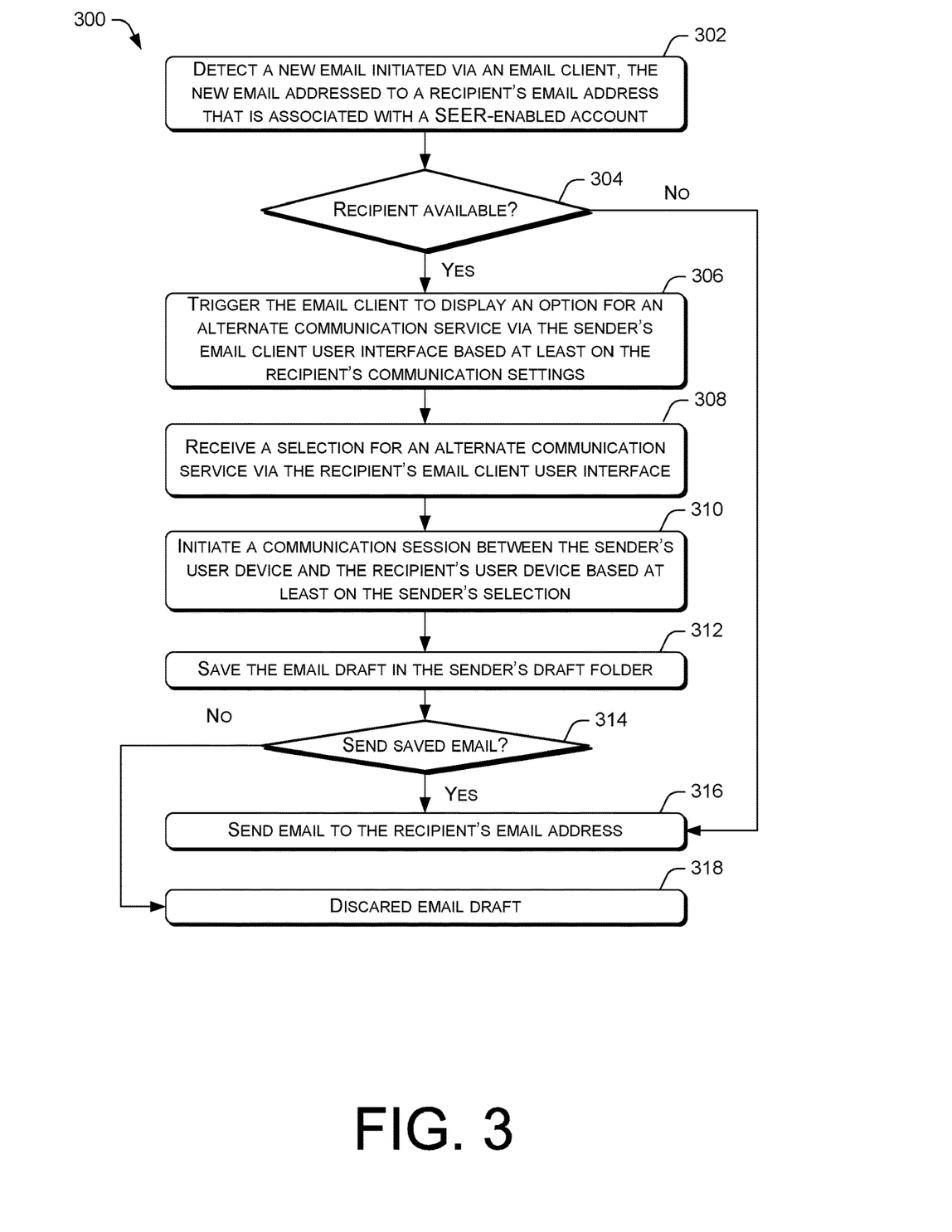
FIG. 3 is a flow diagram of an example process for providing alternate ways to establish communication between a sender and recipient prior to delivering an email from the sender to the recipient.
Figure 4:
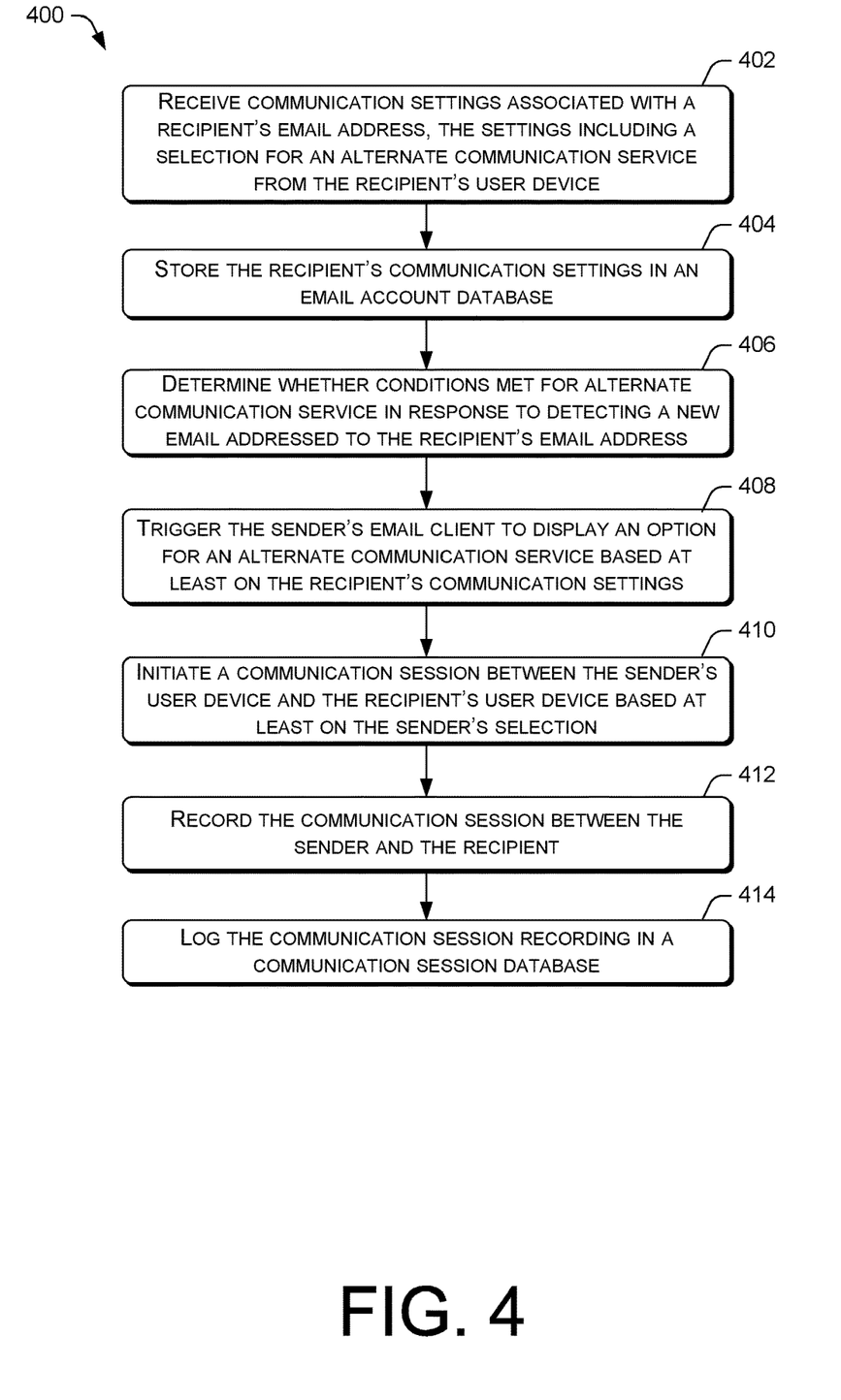
FIG. 4 is a flow diagram of an example process for receiving input for a recipient's communication settings and logging a communication session.

FIGS. 3 and 4 present illustrative processes 300-400 for providing at least one alternate way to establish communication between a sender and a receiver prior to delivering an email from the sender to the recipient, thereby reducing overall email traffic. The processes 300-400 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-400 are described with reference to the network 100 of FIG. 1.

FIG. 3 is a flow diagram of an example process 300 for providing an alternate communication service prior to delivering an email from a sender to a recipient. At block 302, the SEER server and a sender's email client can implement plugins and/or APIs to enable the SEER server to detect a new email initiated via a sender's email client, wherein the new email is addressed to a recipient's email address that is associated with a SEER-enabled email account. At decision block 304, the SEER server determines whether the recipient associated with the recipient's email address is available. For example, the SEER server can query the recipient's user device. In various embodiments, if the recipient has been inactive for a predetermined period of time, the SEER server can determine that the recipient is unavailable. Additionally, or alternatively, the recipient can indicate whether he or she is busy or unavailable. The SEER server can determine that the recipient is available ("yes" response from the decision block 304) upon receiving a positive response from the recipient's user device. In response to determining that the recipient is available, the SEER server triggers the email client to display at least one option for alternate communication service by a way of plugins or APIs. The option for alternate communication service is based at least on the recipient's communication settings as indicated in block 306. If the SEER server determines that the recipient is not available ("no" response from the decision block 304), the sender can continue drafting the email to the recipient and send the email to the recipient's email address. In this way, if the recipient indicates in his or her communication settings that he or she is available to communicate by communication services other than email, but the recipient is not currently available to answer a phone call or respond to a text message, the sender can continue writing an email to the recipient.

At block 308, the SEER server receives a selection for an alternate communication service via the recipient's email client by way of the plugins or APIs. At block 310, based at least on the sender's selection, the SEER server communicates to the sender's email client and/or the recipient's email client to initiate a communication session between the sender's user device and the recipient's user device. At block 312, the email client saves the sender's email in the sender's draft folder. At decision block 314, upon termination of the communication session between the sender's user device and the recipient's user device, the email client prompts the sender whether to continue drafting and/or to send the saved email. If the sender decides to continue drafting and/or to send the email ("yes" response from the decision block 314), the SEER server can facilitate sending the email to the recipient's email address, as indicated in block 316. If the sender decides to discard the email ("no" response from the decision block 314), the email server discards the email draft, as indicated in block 318.

FIG. 4 is a flow diagram of an example process for receiving input for a recipient's communication settings and logging a communication session. At block 402, the SEER server receives from a recipient's user device, communication settings associated with a recipient's email address, the settings including a selection for an alternate communication service. The communication settings can be configured via an email client that can comprise email client plugins or that can access APIs. The communication settings can be communicated to the SEER server. At block 404, the SEER server stores the recipient's communication settings in an email account database. In various embodiments, the recipient's user device can store the recipient's communication settings locally.

At block 406, the SEER server determines whether conditions are met for enabling a sender of an email to select an alternate communication service to communicate with the recipient of the email in response to detecting that the email is addressed to the recipient's email address. In various embodiments, conditions are met for enabling the sender to select an alternate communication service to communicate with the recipient if the recipient is available. Additionally, the conditions may be met based at least on one or more filters. For example, if the sender is associated with one or more pre-selected email addresses, then the sender may be able to select an alternate communication service to communicate with the recipient. In another example, if the subject associated with the email is related to one or more pre-selected keywords, then the sender may be able to select an alternate communication service to communicate with the recipient.

At block 408, the SEER server can trigger the sender's email client to display an alternate communication service based at least on the recipient's communication settings. For example, if the recipient is available by phone and text, the at least one alternate communication service can list phone and text, but not messaging. At block 410, the SEER server initiates a communication session between the sender's user device and the recipient's user device based at least on the sender's selection.

At block 412, the SEER server can record the communication session between the sender and the recipient in response to the sender and/or the recipient selecting the option to record the communication session. At block 414, the SEER server can log the communication session recording, for example, in a communication session database. The communication session recording can be associated with the sender and the recipient. Additionally, if the sender continues drafting an email to send to the recipient, the email can be associated with the communication session recording using meta keywords tags, unique communication session identifier or code, and/or other information.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

detecting a new email initiated via an email client from a first user device, the new email addressed to a recipient's email address that is associated with a recipient's email account;

receiving communication settings associated with the recipient's email account;

triggering the email client to display an option for an alternate communication service to communicate with a recipient associated with the recipient's email address based at least on the communication settings, wherein the alternate communication service comprises at least one of a phone call, a short messaging service, an instant messaging, or a video call;

receiving, from the first user device, a selection for the alternate communication service to communicate with the recipient via the alternate communication service;

determining whether the recipient is available to communicate via the alternate communication service;

in response to determining that the recipient is available to communicate via the alternate communication service, initiating a communication session between the first user device and a second user device associated with the recipient's email account via the alternate communication service;

receiving an additional selection for an additional alternate communication service, wherein the selection and the additional selection are different;

terminating the communication session between the first user device and the second user device; and initiating a new communication session between the first user device and the second user device based at least on the additional selection for the additional alternate communication service.

2. The one or more non-transitory computer-readable media of claim 1, wherein the acts further comprise:

transmitting a notification to a second user device associated with the recipient, the notification indicating that the new email is addressed to the recipient's email address.

3. The one or more non-transitory computer-readable media of claim 1, wherein the acts further comprise:

receiving a request from the first user device or the second user device to record the communication session; and recording the communication session in response to confirming the request to record the communication session.

4. A computer-implemented method, comprising:

detecting a new email initiated via an email client from a first user device, the new email addressed to a recipient's email address that is associated with a recipient's email account;

receiving communication settings associated with the recipient's email account;

triggering the email client to display an option for an alternate communication service to communicate with a recipient associated with the recipient's email address based at least on the communication settings, wherein the alternate communication service comprises at least one of a phone call, a short messaging service, an instant messaging, or a video call;

receiving, from the first user device, a selection for the alternate communication service to communicate with the recipient via the alternate communication service;

determining whether the recipient associated with the recipient is available to communicate via the alternate communication service;

in response to determining that the recipient is available to communicate via the alternate communication service, initiating a communication session between the first user device and a second user device associated with the recipient's email account via the alternate communication service;

receiving an additional selection for an additional alternate communication service, wherein the selection and the additional selection are different;

terminating the communication session between the first user device and the second user device; and initiating a new communication session between the first user device and the second user device based at least on the additional selection for the additional alternate communication service.

5. The computer-implemented method of claim 4, further comprising:

transmitting a notification to a second user device associated with the recipient, the notification indicating that the new email is addressed to the recipient's email address.

6. The computer-implemented method of claim 4, further comprising:

receiving a request from the first user device or the second user device to record the communication session; and recording the communication session in response to confirming the request to record the communication session.

7. A system, comprising:

one or more non-transitory storage mediums configured to provide stored computer-readable instructions, the one or more non-transitory storage mediums coupled to one or more processors, the one or more processors configured to execute the computer-readable instructions to cause the one or more processors to:

receive communication settings associated with a recipient's email address, the communication settings including an alternate communication service, wherein the alternate communication service comprises at least one of a phone call, a short messaging service, an instant messaging, or a video call;

detect a new email initiated via an email client from a user device, the new email addressed to the recipient's email address;

determine whether one or more conditions are met to display an option for the alternate communication service to communicate with a recipient associated with the recipient's email address via the email client based at least on the communication settings;

upon determining that the one or more conditions are met, display the option for the alternate communication service;

receive, from the user device, a selection for the alternate communication service to communicate with the recipient via the alternate communication service;

determine whether the recipient associated with the recipient is available to communicate via the alternate communication service;

in response to determining that the recipient is available to communicate via the alternate communication service, initiate a communication session between the user device and an additional user device associated with a recipient's email account corresponding to the recipient's email address via the alternate communication service;

receive an additional selection for an additional alternate communication service, wherein the selection and the additional selection are different;

terminate the communication session between the user device and the additional user device; and initiate a new communication session between the user device and the additional user device based at least on the additional selection for the additional alternate communication service.

8. The system of claim 7, wherein the one or more processors are further configured to:

receive a request from the user device and the additional user device to record the communication session; and record the communication session in response to confirming the request to record the communication session.

9. The system of claim 7, wherein the communication session is associated with a unique communication session identifier.

10. The one or more non-transitory computer-readable media of claim 1, wherein the acts further comprise:

in response to initiating the communication session, saving the new email via the email client.

11. The one or more non-transitory computer-readable media of claim 10, wherein the acts further comprise:

prompting via the email client to continue drafting the new email or discard the new email.

12. The one or more non-transitory computer-readable media of claim 1, wherein the communication session is a private communication session and the acts further comprise:

receiving a unique communication session code from the first user device and the second user device; and validating the unique communication session code.

13. The computer-implemented method of claim 4, further comprising:

in response to initiating the communication session, saving the new email via the email client.

14. The computer-implemented method of claim 13, further comprising:

prompting via the email client to continue drafting the new email or discard the new email.

15. The system of claim 7, wherein the one or more processors are further configured to:

transmit a notification to the additional user device, the notification indicating that the new email is addressed to the recipient's email address.

* * * * *